United States Patent
Park et al.

(10) Patent No.: US 8,281,815 B2
(45) Date of Patent: *Oct. 9, 2012

(54) MICROFLUIDIC VALVE FILLER AND VALVE UNIT INCLUDING THE SAME

(75) Inventors: Jong-myeon Park, Seoul (KR); Beom-seok Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 209 days.

This patent is subject to a terminal disclaimer.

(21) Appl. No.: 12/027,290

(22) Filed: Feb. 7, 2008

(65) Prior Publication Data

US 2008/0187474 A1 Aug. 7, 2008

(30) Foreign Application Priority Data

Feb. 7, 2007 (KR) .................. 10-2007-0012799

(51) Int. Cl.
*F15C 1/04* (2006.01)
(52) U.S. Cl. .......................... 137/828; 251/11
(58) Field of Classification Search .............. 137/251.1, 137/803, 828; 277/904, 940
See application file for complete search history.

(56) References Cited

U.S. PATENT DOCUMENTS

| | | | |
|---|---|---|---|
| 3,531,413 A | 9/1970 | Rosensweig | |
| 4,025,448 A | 5/1977 | Sudol | |
| 6,068,785 A | 5/2000 | Raj et al. | |
| 6,311,713 B1 * | 11/2001 | Kaartinen | 137/13 |
| 6,375,901 B1 * | 4/2002 | Robotti et al. | 422/103 |
| 7,926,514 B2 * | 4/2011 | Park et al. | 137/828 |
| 2004/0050436 A1 * | 3/2004 | Tsukita et al. | 137/828 |
| 2004/0219732 A1 * | 11/2004 | Burns et al. | 438/200 |
| 2005/0274423 A1 * | 12/2005 | Oka et al. | 137/828 |
| 2006/0219308 A1 | 10/2006 | Oh et al. | |

FOREIGN PATENT DOCUMENTS

WO 94/26414 11/1994

OTHER PUBLICATIONS

Ferro Tec Material Safety Data Sheet, (Ferro Tec) Jan. 2007, [online], [retrieved on Sep. 28, 2009] Retrieved from the Internet <URL: http://www.amazingmagnets.com/documents/MSDSEFH1.pdf>.*
Rohit Pal., et al Phase Change Microvalve for Integrated Devices, Anal. Chem., vol. 76, No. 13 Jul. 1, 2004 pp. 3740-3748.
Robin Hui Liu., et al Self-contained, Fully Integrated Biochip for Sample Preparation, Polymerase Chain Reaction Amplification, and DNA Microarray Detection. Anal Chem., vol. 76 No. 7, Apr. 1, 2004 pp. 1824-1831.

* cited by examiner

*Primary Examiner* — Craig Schneider
(74) *Attorney, Agent, or Firm* — Sughrue Mion, PLLC (57) ABSTRACT

Provided are a valve filler and a valve unit including the valve filler. The valve filler includes: a phase transition material; and a heating fluid comprising a carrier oil and a plurality of micro heating particles suspended in the carrier oil, the heating fluid being mixed with the phase transition material, wherein, when external energy is supplied, the micro heating particles receive the external energy and generate heat to melt the phase transition material into a fluid state, and when no external energy is supplied, the phase transition material hardens into a solid state.

18 Claims, 5 Drawing Sheets

MICROFLUIDIC VALVE FILLER AND VALVE UNIT INCLUDING THE SAME

CROSS-REFERENCE TO RELATED PATENT APPLICATION

The application claims the benefit of Korean Patent Application No. 10-2007-0012799, filed on Feb. 7, 2007, in the Korean Intellectual Property Office, the disclosure of which is incorporated herein in its entirety by reference.

BACKGROUND OF THE INVENTION

1. Field of the Invention

The present invention relates to a valve unit for controlling the flow of a fluid in microfluidic devices, and more particularly, to a valve filler for closing a channel through which a fluid flows and a valve unit including the valve filler.

2. Description of the Related Art

In a microfluidic device designed for performing series of biochemical reactions such as DNA lysis and amplification reactions, a micro-channel forming the flow path for a fluid is formed in a substrate. One of such microfluidic devices is a lab-on-a-chip, where a lysis reaction and a polymerase chain reaction (PCR) can be performed in sequence. The substrate may have a valve unit that contains a valve filler which closes the micro-channel to block the fluid and opens the micro-channel to allow the fluid to flow.

A microvalve unit having a paraffin wax valve filler has been reported. Robin Hui Liu, et al., Anal. Chem., 76 (7), pp. 1824-1831 (2004); Rohit Pal, et al., Anal. Chem., 76 (13), 3740-3748 (2004). According to these references, the valve unit has a block of paraffin that initially closes the channel, and, in order to open the channel, the paraffin is melted using a heater underneath an moved downstream by the pressure from the upstream channel. In such a microfluidic system, however, a large amount of paraffin wax is needed to close the micro-channel, and a large-sized heating member is needed to melt the large amount of paraffin wax, thereby making it difficult to miniaturize and integrate the substrate for biochemical reactions. Also, it takes a long time for the paraffin wax to reach its melting point and it is difficult to precisely control the timing of opening the channel.

SUMMARY OF THE INVENTION

The present invention provides a valve filler, which can quickly melt when energy is supplied thereto, and a valve unit including the valve filler.

According to an aspect of the present invention, there is provided a valve filler composition comprising: a phase transition material which is in sold phase at a temperature below its melting point and is in fluidic phase at a temperature of or above its melting point; and a heating fluid comprising a carrier oil and a plurality of micro heating particles dispersed in the carrier oil, the heating fluid being mixed with the phase transition material, wherein, the valve filler composition is in solid phase at room temperature, and transforms into the fluidic phase when external energy is supplied to the valve filler.

The phase transition material may be one selected from the group consisting of a wax, a gel, and a thermoplastic resin.

The wax may be a paraffin wax having a melting point of 50 to 100° C.

The heating fluid may comprise 77 to 92 wt % of a carrier oil, 1 to 5 wt % of micro heating particles, and the remainder of a surfactant, and the micro heating particles may be ferromagnetic particles.

The micro heating particles may be fine metal oxide particles.

The heating fluid may have a magnetic flux density of 125 to 250 gauss (G).

The heating fluid may have a volume ratio of 10 to 70% to the volume of the valve filler. The heating fluid may have a volume ratio of 50% to the volume of the valve filler.

According to another aspect of the present invention, there is provided a valve unit comprising: a channel which forms a flow path of a fluid; a valve filler which closes a portion of the channel when the flow path of the fluid needs to be blocked; and an external energy source supplying energy to the valve filler, wherein the valve filler comprises: a phase transition material which is in solid phase at a temperature below its melting point and which is in fluidic phase at a temperature of or above its melting point; and a heating fluid comprising a carrier oil and a plurality of micro heating particles dispersed in the carrier oil, wherein the heating fluid is mixed with the phase transition material, wherein, the valve filler is in solid phase at room temperature, and transforms into the fluidic phase when external energy is supplied to the valve filler. The external energy source may emit an electromagnetic wave.

The external energy source may comprise a laser light source emitting a laser beam.

The laser beam emitted by the laser light source may be a continuous-wave laser beam having an output of at least 10 mW. The laser beam may have an output of 1.5 to 2.0 W.

When no energy is supplied from the external energy source to the valve filler, the valve filler may solidifies in the channel to close the channel, and when energy is supplied from the external energy source to the valve filler, the valve filler may receive the energy and melts into a fluid state to open the channel.

The valve unit may further comprise a valve filler chamber to receive the valve filler, in which the valve filler chamber is connected to the channel through a connecting passage and is fluid communicated with the channel, wherein a part of the valve filler of fluidic phase, in the valve filler chamber, flows into the channel, when energy is supplied from the external energy source, and solidifies and closes the channel, when the energy supply stops.

When energy is supplied from the external energy source to the valve filler closing the channel, the valve filler closing the channel may receive the energy, melt into a fluid state, and open the channel again.

According to another embodiment of the present invention, there is provided a valve filler composition comprising: a wax which has a melting point of 50 to 100° C.; and a heating fluid, which comprises a carrier oil and a plurality of micro heating magnetic particles dispersed in the carrier oil, wherein, the heating fluid is mixed with the wax, wherein, the valve filler composition is in solid phase at room temperature, and changes into the fluidic phase when external energy is supplied to the valve filler, wherein the heating fluid has magnetic flux density of 125 to 250 Gauss, and wherein the time for the valve filler composition to change from the solid phase at a temperature 25° C. lower than the melting point of the wax to the fluidic phase is less than about three seconds when a laser beam of 1.5 W is applied to the valve filler composition, when the volume of the valve composition is not greater than ten microliters.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1A:
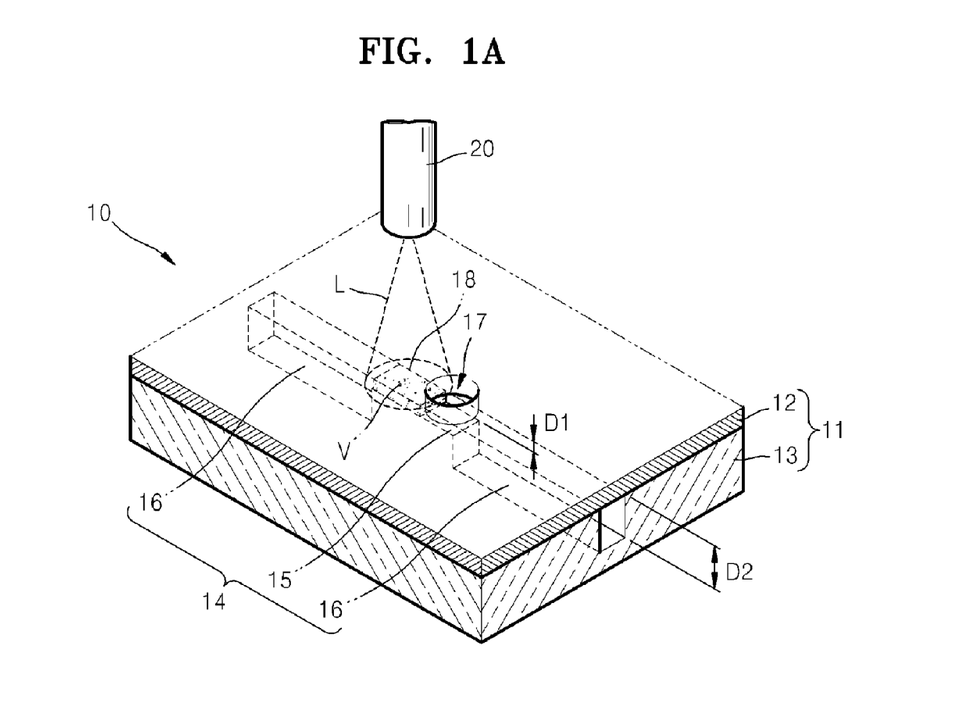
FIG. 1A is a perspective view of a valve unit according to an embodiment of the present invention when a channel is closed.
Figure 1B:
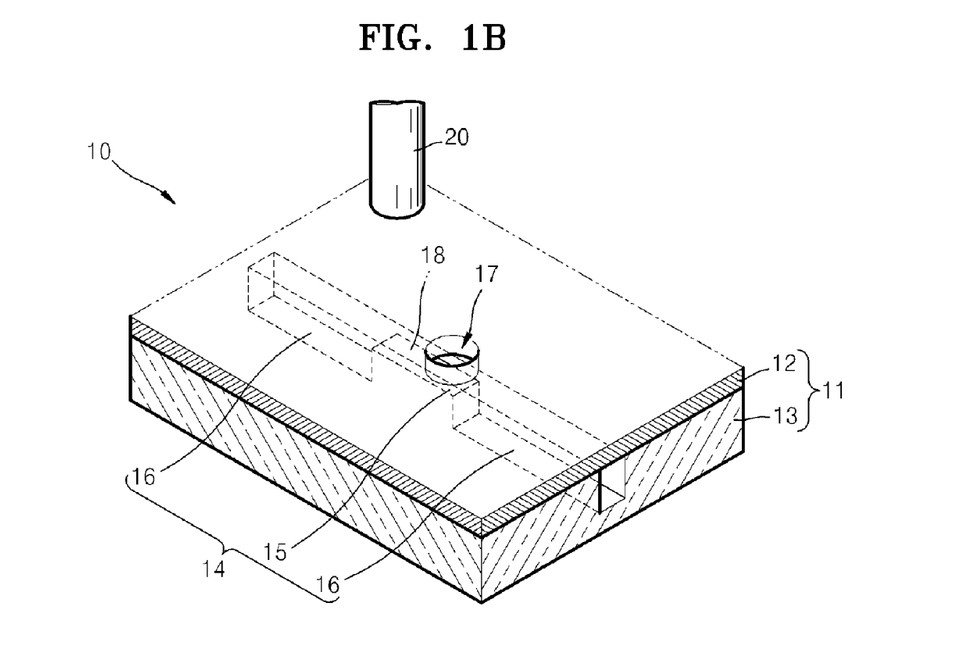
FIG. 1B is a perspective view of the valve unit of FIG. 1A when the channel is opened.

FIG. 1A is a perspective view of a valve unit 10 according to an embodiment of the present invention when a channel 14 is closed. FIG. 1B is a perspective view of the valve unit 10 of FIG. 1A when the channel 14 is opened.

Referring to FIG. 1A, the valve unit 10 includes the channel 14 forming the flow path of a fluid, a valve filler V closing the channel 14, and a laser light source 20, which is an external energy source, supplying energy to the valve filler V. The channel 14 is a micro-channel formed in a substrate 11. The substrate 11 includes an upper plate 12 and a lower plate 13 bonded to each other. The upper and lower plates (12, 13) may be formed of a material known in the art, which includes, but is not limited to, polycarbonate. The upper plate 12 and the lower plate 13 may be bonded to each other by a double-sided adhesive tape (not shown), by ultrasonic welding, or by other methods.

An injection hole 17 through which the fluid valve filler V is injected into the channel 14 is formed in the upper plate 12. The channel 14 comprises a first area 15 of a first dimension D1 and a pair of second areas 16 adjacent to the first area 15. The second areas 16 are of a second dimension D2 which is larger than D1. A valve gap 18 is formed at a portion of the first area 15, which is not overlapped with the injection hole 17. When the fluid valve filler V is injected into the first area 15 of the channel 14 through the injection hole 17, the fluid valve filler V remains in the valve gap 18 in the first area 15 due to capillary force. The valve filler V remaining in the valve gap 18 solidifies at room temperature, thereby closing the channel 14.

Referring to FIGS. 1A and 1B, the laser light source 20 includes a laser diode (LD) and emits a laser beam L toward the solid valve filler V in the valve gap 18. When the laser light source 20 emits a laser beam L to the solid valve filler V in the valve gap 18, the solid valve filler V melts into a fluid state. The fluid valve filler V flows into the second areas 16 of the channel 14, thereby opening the channel 14. In one embodiment, the valve filler V melts when a laser beam of a continuous-wave laser beam L having an output of at least 10 mW is applied.

The valve filler V is formed by mixing a phase transition material and a heating fluid. The phase transition material may be one selected from the group consisting of a wax, a gel, and a thermoplastic resin. The wax may be a paraffin wax. The gel may be one selected from the group consisting of polyacrylamide, polyacrylates, polymethacrylates, and polyvinylamides. The thermoplastic resin may be one selected from the group consisting of cyclic olefin copolymer (COC), polymethylmethacrylate (PMMA), polycarbonate (PC), polystyrene (PS), polyoxymethylene (POM), perfluoralkoxy (PFA), polyvinylchloride (PVC), polypropylene (PP), polyethylene terephthalate (PET), polyetheretherketone (PEEK), polyamide (PA), polysulfone (PSU), and polyvinylidene fluoride (PVDF).

The heating fluid may be magnetic liquids, which are commonly referred to as "ferrofluids," which typically comprise a colloidal dispersion of finely-divided magnetic particles, such as iron, $\gamma$-$Fe_2O_3$, magnetite and combinations thereof, of subdomain size (for example, 10 to 300 A°) in a liquid carrier. The dispersion of the particles is maintained in the liquid carrier by a surfactant which coats the particles. In the present invention, oil-based ferrofluids, which include a hydrophobic carrier oil and a plurality of micro heating magnetic particles dispersed in the carrier oil, may be used. Each of the micro heating particles has a diameter of tens to hundreds of nanometers (nm) such that the micro heating particles can freely pass through the channel 14 having the depth D1 or D2 of approximately 0.1 mm. When energy is supplied, for example, by laser radiation, the temperature of the micro heating particles is drastically increased by the energy such that the micro heating particles generate heat.

A mixture of wax and a ferromagnetic material is known in the art. For example, U.S. Pat. No. 4,025,448 discloses superparamagnetic wax compositions useful in magnetic levitation separations. A ferrofluid which contains a carrier fluid and magnetic material particles compositions are widely known, and typical ferrofluid compositions are described, for example, in U.S. Pat. No. 3,531,413. The magnetic particles which form a ferrofluid typically are comprised of a fine metal oxide, for example an iron oxide. There are available commercial products of ferrofluids, such as ferrofluid supplied by Ferrotech Inc. The ferrofluid is composed of 77 to 92 wt % of a carrier oil, 1 to 5 wt % of iron oxide particles having a mean diameter of 10 nm, 6 to 16 wt % of a dispersant (surfactant), and 1 to 2 wt % of an additive. Ferrofluid products available from Ferrotech Inc. include ferrofluids having a magnetic flux density of 125 gauss (G) and ferrofluids having a magnetic flux density of 250 G. Such ferrofluids may be prepared employing the methods described in, for example, U.S. Pat. No. 6,068,785, content of which is incorporated herein in its entirety as reference.

A solid valve filler V must have high pressure resistance in order to withstand high pressure and must quickly melt when energy is supplied by, for example, an external energy source.

In order to optimize valve filler V composition satisfying the above requirements, tests for measuring response times, which were measure as time period required for the channel 14 to be opened, were performed by employing an LD which emits laser beams L to valve fillers V and interpreting continuous photographs taken by a high speed camera. In the tests, phase transition materials used were paraffin waxes, heating fluids were ferrofluids, and a laser beam L used was a continuous-wave laser beam having an output of 1.5 W.

In order to optimize the composition of the valve filler V, the portion of micro heating particles included in a heating fluid (i.e., magnetic flux density of the fluid), the melting point of a phase transition material, and the volume ratio of the heating fluid included in a valve filler V were considered as parameters. In order to determine a relationship between a response time and the number of micro heating particles, a ferrofluid having a magnetic flux density of 125 G and a ferrofluid having a magnetic flux density of 250 G were prepared. In order to determine a relationship between a response time and the melting point of a phase transition material, a paraffin wax having a melting point of 51° C. and a paraffin wax having a melting point of 71° C. were prepared. The tests were carried out at about 25° C. of room temperature by applying the laser diode out power of 1.5 W. About 40 nanoliter of the valve filler compositions was placed on a glass slide and the response time was measured by analyzing images capture by high speed camera. However, it should be noted that the response time is irrelevant to the container where the valve filler composition is loaded or the volume of the valve filler composition tested, as long as the volume of the valve filler composition is as small as several microliters. In order to know a relationship between a response time and the volume ratio of a heating fluid, a heating fluid having a volume ratio of 10% and a heating fluid having a volume ratio of 50% were prepared. Response times of eight valve fillers V obtained by combining the three factors are shown in Table 1. The test was performed twice for each of the eight valve fillers V.

TABLE 1

| Test | Magnetic flux density (G) | Melting point (° C.) | Volume ratio of heating fluid (vol %) | Response time (sec) |
| --- | --- | --- | --- | --- |
| 1 | 125 | 51 | 10 | 4.219 |
| 2 | 250 | 51 | 10 | 1.625 |
| 3 | 125 | 71 | 10 | 46.002 |
| 4 | 250 | 71 | 10 | 6.428 |
| 5 | 125 | 51 | 50 | 1.019 |
| 6 | 250 | 51 | 50 | 0.841 |
| 7 | 125 | 71 | 50 | 2.249 |
| 8 | 250 | 71 | 50 | 0.84 |
| 9 | 125 | 51 | 10 | 5.228 |
| 10 | 250 | 51 | 10 | 2.644 |
| 11 | 125 | 71 | 10 | 40.219 |
| 12 | 250 | 71 | 10 | 10.002 |
| 13 | 125 | 51 | 50 | 1.412 |
| 14 | 250 | 51 | 50 | 0.694 |
| 15 | 125 | 71 | 50 | 2.294 |
| 16 | 250 | 71 | 50 | 2.849 |

Figure 2A:
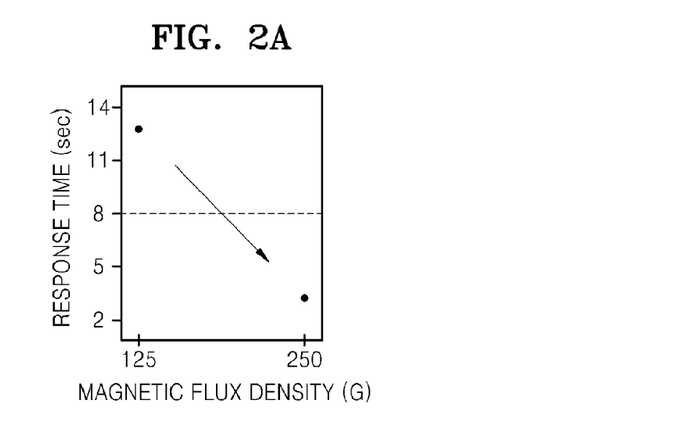
FIG. 2A is a graph illustrating a relationship between the response time of a valve unit and the magnetic flux density of a heating fluid included in a valve filler according to an embodiment of the present invention.
Figure 2B:
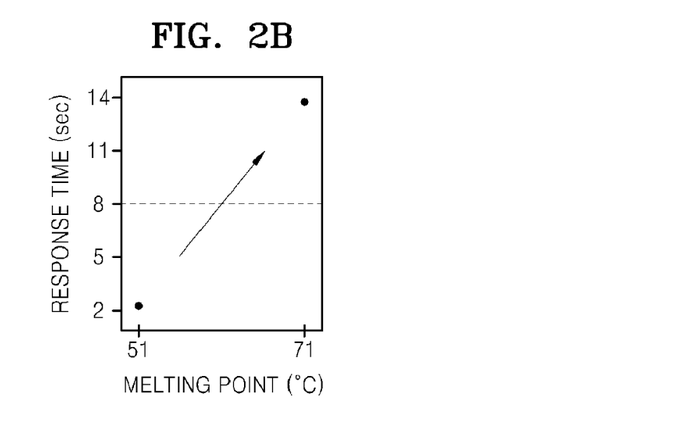
FIG. 2B is a graph illustrating a relationship between the response time of a valve unit and the melting point of a phase transition material, e.g., a paraffin wax, included in a valve filler according to an embodiment of the present invention.
Figure 2C:
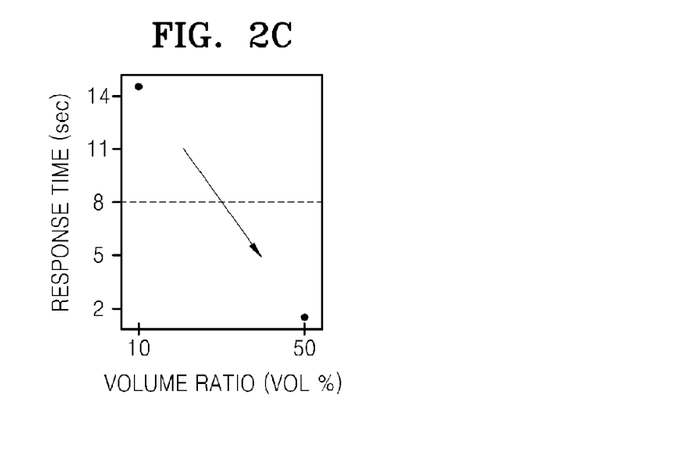
FIG. 2C is a graph illustrating a relationship between the response time of a valve unit and the volume ratio of a heating fluid included in a valve filler according to an embodiment of the present invention.

Relationships between the response times and the respective three factors obtained from Table 1 are shown in FIGS. 2A, 2B, and 2C. That is, FIG. 2A is a graph illustrating a relationship between the response time of a valve unit and the magnetic flux density of a heating fluid included in a valve filler according to an embodiment of the present invention based on the average response times when the magnetic flux density is 125 G and the average of the response times when the magnetic flux density is 250 G. FIG. 2B is a graph illustrating a relationship between the response time of a valve unit and the melting point of a paraffin wax included in a valve filler according to an embodiment of the present invention based on the average response times when the melting point of the paraffin wax is 51° C. and the average response times when the melting point of the paraffin wax is 71° C. FIG. 2C is a graph illustrating a relationship between the response time of a valve unit and the volume ratio of a heating fluid included in a valve filler according to an embodiment of the present invention based on the average response times when the volume ratio is 10 vol % and the average of the response times when the volume ratio is 50 vol %.

It is found from FIG. 2A that as the magnetic flux density increases, the response time taken to melt the valve filler V decreases. Since magnetic flux density is substantially proportional to the number of micro heating particles, it is inferred that as the number of the micro heating particles increases, the response time decreases. As shown in Test 5 of Table 1, even when the magnetic flux density is 125 G, a short response time of 1 second or so can be achieved by varying other factors. Accordingly, a heating fluid having a magnetic flux density of 125 G can be used to manufacture a valve filler V according to the present invention.

It is found from FIG. 2B that as the melting point of the paraffin wax decreases, the response time taken to melt the valve filler V decreases. As shown in Test 8 of Table 1, even when the melting point of the paraffin wax is 71° C., a response time of 1 second or less can be achieved by varying other factors. Accordingly, a paraffin wax having a melting point of 50 to 100° C. can be used to manufacture a valve filler V according to the present invention.

It is found from FIG. 2C that as the volume ratio of the heating fluid included in the valve filler V increases, the response time taken to melt the valve filler V decreases. As shown in Test 2 of Table 1, even when the volume ratio of the heating fluid is 10 vol %, a response time of approximately 1.6 seconds can be achieved by varying the other factors. Accordingly, a heating fluid having a volume ratio of 10 vol % can be included in a valve filler according to the present invention.

As shown in Tests 6 and 14 of Table 1, when the magnetic flux density of the heating fluid is 250 G, the melting point of the paraffin wax is 51° C., and the volume ratio of the heating fluid is about 50 vol %, a valve filler V having the shortest response time could be obtained.

In order to more clearly comprehend a relationship between a response time and the volume ratio of a heating fluid included in a valve filler, the inventors measured response times at various the volume ratio of the heating fluid, while employing fixed magnetic flux density of the heating fluid of 250 G, the melting point of a paraffin wax of 51° C., and a laser beam emitted to the valve filler being a continuous-wave laser beam having an output of 1.5 W. The test result is shown in FIG. 3.

Figure 3:
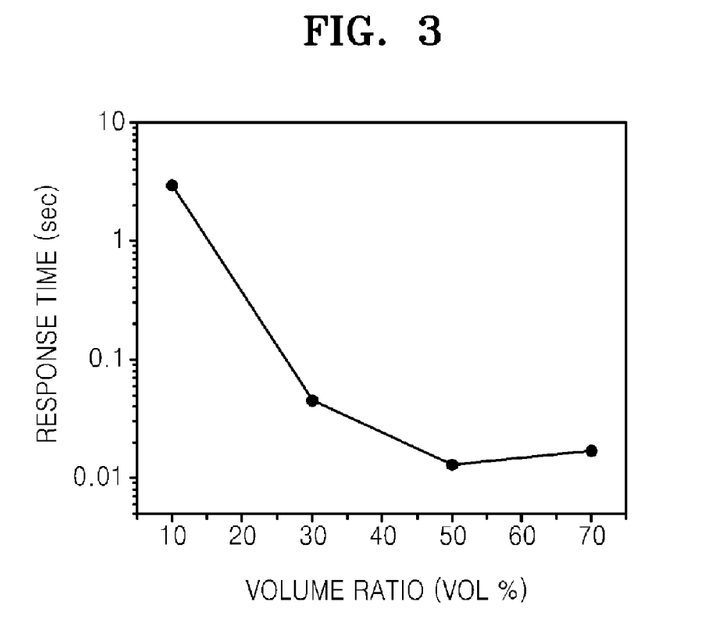
FIG. 3 is a graph illustrating a relationship between the response time of a valve unit and the volume ratio of a heating fluid included in a valve filler, when the melting point of a paraffin wax and the magnetic flux density of the heating fluid included in the valve filler are fixed, according to an embodiment of the present invention.

Referring to FIG. 3, a response time is low when the volume ratio of the heating fluid ranges 50 to 70 vol %. However, a pressure that a solid valve filler can withstand is 411 kPa when the volume ratio is 50 vol % and is 125 kPa when the volume ratio is 70 vol %. Accordingly, the pressure that the solid valve filler can withstand when the volume ratio is 70 vol % is much less than that when the volume ratio is 50 vol %. Accordingly, considering both the response time and the pressure that the solid valve filler can withstand, the optimal valve filler may contain about 50 vol % of the heating fluid.

The inventors also measured response times by varying the output of a laser beam emitted to a valve filler including a heating fluid whose magnetic flux density is 250 G and volume ratio is 50 vol % and a paraffin wax whose melting point is 51° C. The test result is shown in FIG. 4.

Figure 4:
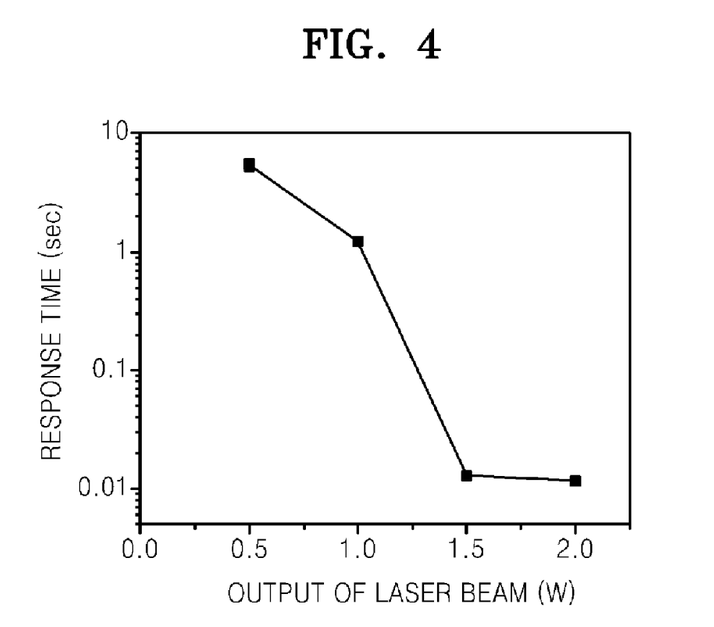
FIG. 4 is a graph illustrating a relationship between the response time of a valve unit and the output of a laser beam emitted to a valve filler according to an embodiment of the present invention.

Referring to FIG. 4, a response time is very low when the output of the laser beam emitted to the valve filler ranges from 1.5 to 2.0 W. The response time when the output of the laser beam is 2.0 W is slightly shorter than the response time when the output of the laser beam is 1.5 W. However, since power consumption when the output of the laser beam is 2.0 W is higher than that when the power output of the laser beam is 1.5 W, it is economically advantageous to use the laser beam having the output of 1.5 W.

According to one embodiment, the valve filler composition comprises a wax which has a melting point of 50 to 100° C.; and a heating fluid, which comprises a carrier oil and a plurality of micro heating magnetic particles dispersed in the carrier oil, wherein, the heating fluid is mixed with the wax, wherein, the valve filler composition is in solid phase at room temperature, and changes into the fluidic phase when external energy is supplied to the valve filler, wherein the heating fluid has magnetic flux density of 125 to 250 Gauss, and wherein the time for the valve filler composition to change from the solid phase at a temperature 25° C. lower than the melting point of the wax to the fluidic phase is less than about three seconds when a laser beam of 1.5 W is applied to the valve filler composition, when the volume of the valve filler composition is not greater than ten micro liters.

Figure 5A:
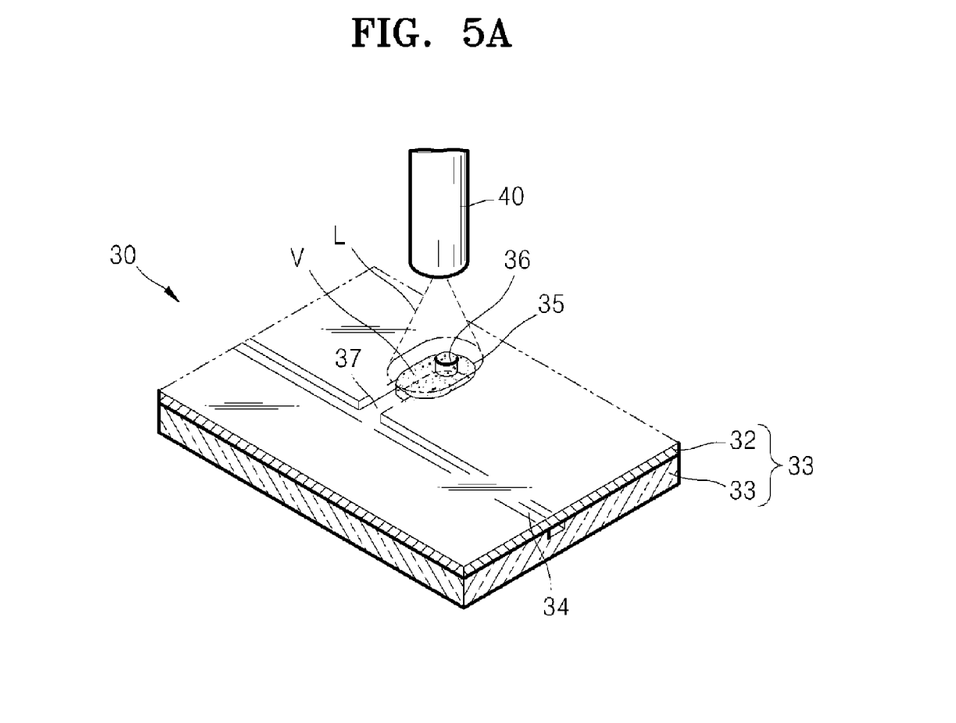
FIG. 5A is a perspective view of a valve unit according to another embodiment of the present invention when a channel is opened.
Figure 5B:
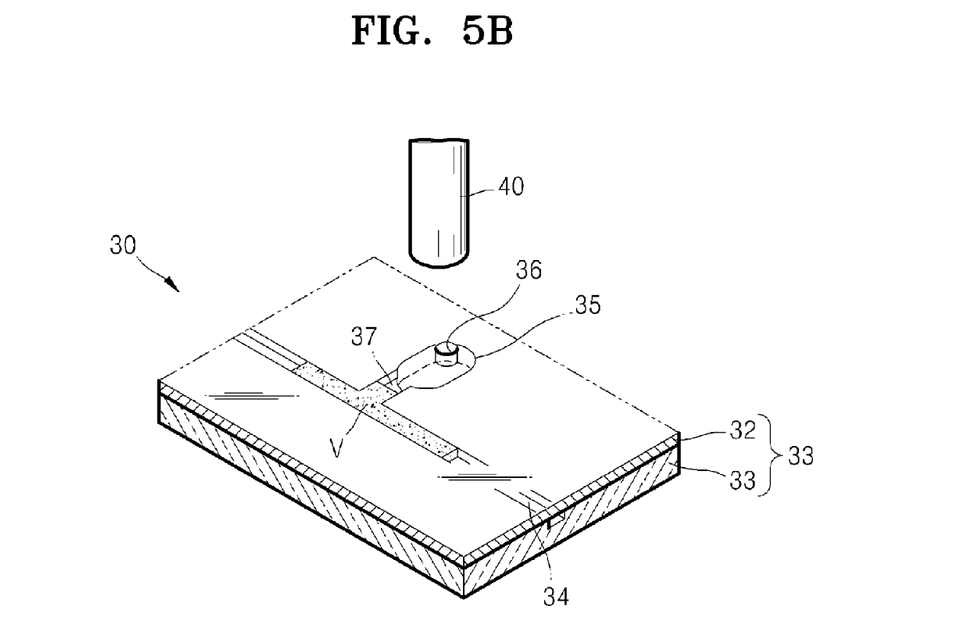
FIG. 5B is a perspective view of the valve unit of FIG. 5A when the channel is closed.

FIGS. 5A and 5B are perspective views of a valve unit 30 according to another embodiment of the present invention when a channel 34 is opened and the channel 34 is closed, respectively.

Referring to FIG. 5A, the valve unit 30 includes the channel 34 forming the flow path of a fluid, a valve filler V for closing the channel 34, and a laser light source 40, which is an external energy source, supplying energy to the valve filler V. The channel 34 is formed in a substrate 31 that includes an upper plate 32 and a lower plate 33. The upper plate 32 and the lower plate 33 may be bonded by a double-sided adhesive tape (not shown), by ultrasonic welding, or by other methods.

The channel 34, a valve chamber 35 disposed near the channel 34, and a connecting passage 37 connecting the valve chamber 35 and the channel 34 are formed in the lower plate 33. The valve filler V is accommodated in the valve chamber 35. An injection hole 36 through which a fluid valve filler V is injected into the valve chamber 35 is formed in the upper plate 32. The fluid valve filler V injected through the injection hole 36 into the valve chamber 35 solidifies in the valve chamber 35 at room temperature. Since the valve filler V is the same as the valve filler V included in the valve unit 10 of FIGS. 1A and 1B, a detailed explanation thereof will not be given.

Referring to FIG. 5B, the laser light source 40 includes an LD and emits a laser beam L to the solid valve filler V in the valve chamber 35. When the laser light source 40 emits the laser beam L to the solid valve filler V in the valve chamber 35, the solid valve filler V melts into a fluid state due to external energy supplied by the laser beam L such that the fluid valve filler V expands suddenly. Accordingly, the fluid valve filler V flows through the connecting passage 37 to the channel 34, and then hardens again, thereby closing the channel 34.

Figure 6:
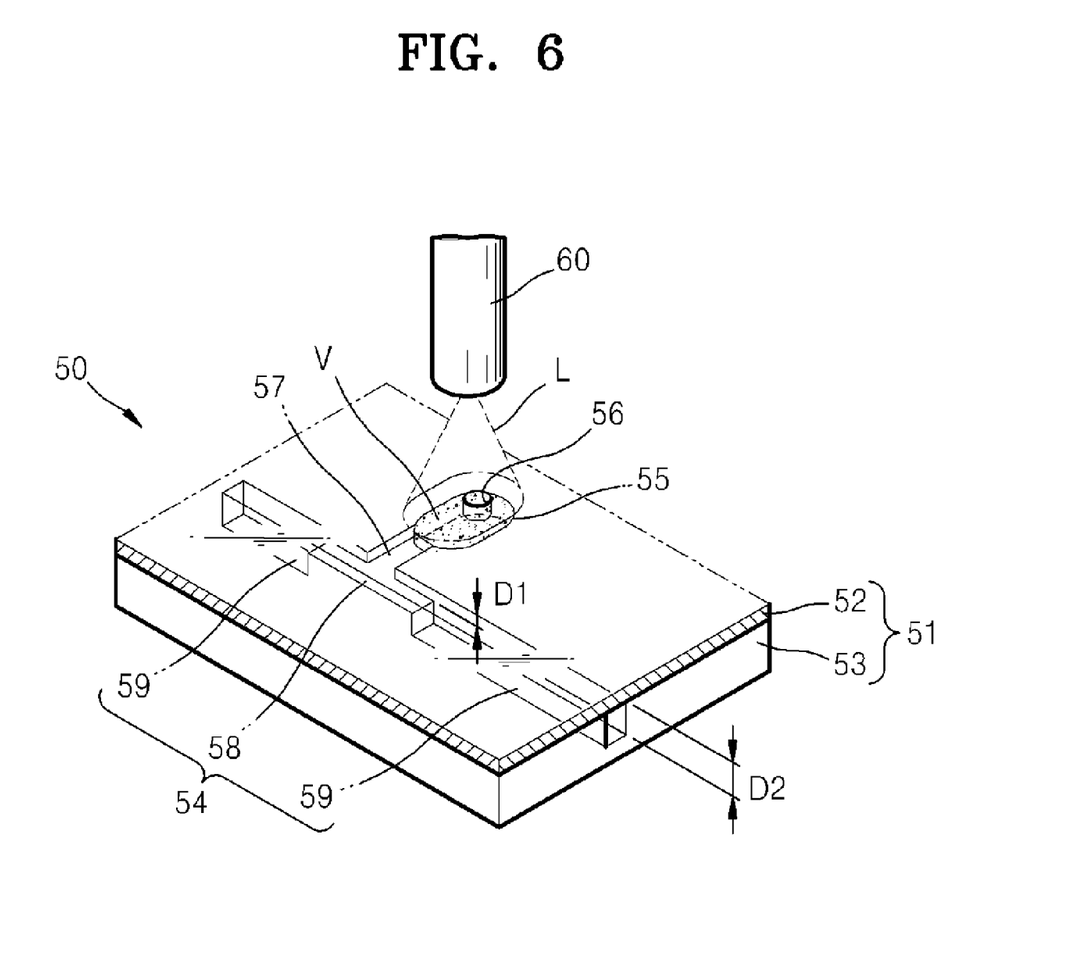
FIG. 6 is a perspective view of a valve unit according to another embodiment of the present invention.

FIG. 6 is a perspective view of a valve unit 50 according to another embodiment of the present invention.

Referring to FIG. 6, the valve unit 50 includes a channel 54 forming the flow path of a fluid, a valve filler V for closing the channel 54, and a laser light source 60, which is an external energy source, supplying energy to the valve filler V. The channel 54 is formed in a substrate 51 that includes an upper plate 52 and a lower plate 53. The upper plate 52 and the lower plate 53 may be bonded by a double-sided adhesive tape (not shown), by ultrasonic welding, or by other methods.

The channel 54, a valve chamber 55 disposed near the channel 54, and a connecting passage 57 connecting the valve chamber 55 and the channel 54 are formed in the lower plate 53. The channel 54 comprises a first area 58 of a first dimension D1 and a pair of second areas 59 adjacent to the first area 58. The second areas 59 are of a second dimension D2 which is larger than D1. The connecting passage 57 is connected to the first area 58. The valve filler V is accommodated in the valve chamber 55. An injection hole 56 through which the fluid valve filler V is injected into the valve chamber 55 is formed in the upper plate 52. The fluid valve filler V injected through the injection hole 56 into the valve chamber 55 solidifies in the valve chamber 55 at room temperature. Since the valve filler V is the same as the valve filler V included in the valve unit 10 of FIGS. 1A and 1B, a detailed explanation thereof will not be given.

The laser light source 60 includes an LD and emits a laser beam L to the solid valve filler V in the substrate 51. In the initial state when the valve filler V is in a solid state in the valve chamber 55, the channel 54 is opened. When the laser light source 60 emits a laser beam L to the solid valve filler V in the valve chamber 55, the solid valve filler V melts into a fluid state due to external energy supplied by the laser beam L such that the valve filler V expands quickly. Accordingly, the fluid valve filler V flows to the first area 58 of the channel 54 through the connecting passage 57, and then hardens again, thereby closing the channel 54. Although not shown, when a laser beam L is emitted again to the solid valve filler V in the channel 54, the valve filler V melts again into a fluid state such that the fluid valve filler V flows into the second areas 59 of the channel 54, thereby opening the channel 54.

As described above, the valve filler and the valve unit according to the present invention can rapidly open or close the channel by supplying energy without contacting the substrate in which the channel is formed. A biochemical reaction device employing the valve filler and the valve unit according to the present invention can be miniaturized. Furthermore, the valve unit according to the present invention can increase reliability by decreasing a response time and increasing pressure resistance.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:
1. A valve filler composition comprising:
a phase transition material which has a melting point of approximately 70° C. and which is in solid phase at a temperature below its melting point and which is in fluidic phase at a temperature of or above its melting point;
a heating fluid having a magnetic flux density of 250 Gauss and comprising a carrier oil and a plurality of micro heating particles dispersed in the carrier oil, and
an external energy source supplying external energy to the valve filler composition, wherein the external energy source comprises a laser light source,
wherein the heating fluid is mixed with the phase transition material, wherein, the valve filler composition is in solid phase at room temperature, and transforms into the fluidic phase when the external energy is supplied to the valve filler composition, and wherein, when the external energy is supplied to the valve filler composition, the micro heating particles dispersed in the carrier oil generate heat, to change the phase transition material from the solid phase into the fluidic phase in less than one second.

2. The valve filler composition of claim 1, wherein the phase transition material is one selected from the group consisting of a wax, a gel, and a thermoplastic resin.

3. The valve filler composition of claim 1, wherein the heating fluid comprises 77 to 92 wt % of the carrier oil, 1 to 5 wt % of the micro heating particles, and the remainder of a surfactant.

4. The valve filler composition of claim 1, wherein the micro heating particles are fine metal oxide particles or ferromagnetic particles.

5. The valve filler composition of claim 1, wherein the heating fluid is contained in an amount of 40-60% by volume and the phase transition material is contained in an amount of 40-60% by volume.

6. The valve filler composition of claim 1, wherein the valve filler composition changes from the solid phase to the fluidic phase in less than one second when a laser beam of 1.5 W of the laser light source is applied to the valve filler composition, and the volume of the valve filler composition is not greater than ten microliters.

7. A valve unit comprising:
a channel which forms a flow path of a fluid;
a valve filler which closes a portion of the channel when the flow path of the fluid needs to be blocked; and
an external energy source supplying external energy to the valve filler to open a portion of the channel when the flow path of the fluid needs to be unblocked,
wherein the external energy source comprises a laser light source emitting a laser light beam,
wherein the valve filler comprises:
a phase transition material which has a melting point of 50 to 100° C. and is in solid phase at a temperature below its melting point and which is in fluidic phase at a temperature of or above its melting point; and
a heating fluid having a magnetic flux density of 250 Gauss and comprising a carrier oil and a plurality of micro heating particles dispersed in the carrier oil,
wherein the heating fluid is mixed with the phase transition material, and the heating fluid has a volume ratio of approximately 50% with respect to the valve filler,
wherein, the valve filler is in solid phase at room temperature, and transforms into the fluidic phase when the external energy is supplied to the valve filler, and
wherein, when the external energy is supplied to the valve filler, the micro heating particles dispersed in the carrier oil generate heat, to change the phase transition material from the solid phase into the fluidic phase in less than one second.

8. The valve unit of claim 7, wherein the phase transition material is one selected from the group consisting of a wax, a gel, and a thermoplastic resin.

9. The valve unit of claim 7, wherein the heating fluid comprises 77 to 92 wt % of the carrier oil, 1 to 5 wt % of the micro heating particles, and the remainder of a surfactant.

10. The valve unit of claim 7, wherein the micro heating particles are fine metal oxide particles or ferromagnetic particles.

11. The valve unit of claim 7, wherein the valve filler changes from solid phase to fluidic phase, when external energy is supplied from the external energy source to the valve filler of the solid phase, in the channel, thereby opening the channel.

12. The valve unit of claim 7, wherein the valve filler composition changes from the solid phase to the fluidic phase in less than one second when a laser beam of 1.5 W of the laser light beam is applied to the valve filler composition, and the volume of the valve filler composition is not greater than ten microliters.

13. The valve unit of claim 7, wherein the laser beam emitted by the laser light source is a continuous-wave laser beam having an output of at least 10 mW.

14. The valve unit of claim 13, wherein the laser beam has an output of 1.5 to 2.0 W.

15. The valve unit of claim 7, which further comprises a valve filler chamber to receive the valve filler, in which the valve filler chamber is connected to the channel through a connecting passage and is fluid communicated with the channel, wherein a part of the valve filler of fluidic phase, in the valve filler chamber, flows into the channel, when energy is supplied from the external energy source, and solidifies and closes the channel, when the energy supply stops.

16. The valve unit of claim 15, wherein, when energy is supplied from the external energy source to the valve filler of solid phase, which closes the channel, the valve filler changes from the solid phase into fluid state, thereby opens the channel.

17. A valve filler composition comprising:
a wax which has a melting point of 50 to 100° C.;
a heating fluid, which comprises a carrier oil and a plurality of micro heating magnetic particles dispersed in the carrier oil, and
an external energy source supplying external energy to the valve filler composition, wherein the external energy source comprises a laser light source,
wherein, the heating fluid is mixed with the wax and the heating fluid has a volume ratio of 10% with respect to the valve filler composition,
wherein, the valve filler composition is in solid phase at room temperature, and changes into the fluidic phase when a laser light is supplied to the valve filler composition,
wherein the heating fluid has magnetic flux density of 125 to 250 Gauss, and
wherein the time for the valve filler composition to change from the solid phase to the fluidic phase is less than two seconds when a laser beam of 1.5 W of the laser light is applied to the valve filler composition, and the volume of the valve composition is not greater than ten microliters.

18. A valve filler composition comprising:
a phase transition material having a melting point of 50 to 100° C. and which is in solid phase at a temperature below its melting point and which is in fluidic phase at a temperature of or above its melting point;
a heating fluid having a magnetic flux density of 125 to 250 Gauss and comprising a carrier oil and a plurality of micro heating particles dispersed in the carrier oil, and
an external energy source supplying external energy to the valve filler composition, wherein the external energy source comprises a laser light source,
wherein the heating fluid is mixed with the phase transition material and the heating fluid has a volume ratio of 50% with respect to the valve filler composition,
wherein, the valve filler composition is in solid phase at room temperature, and transforms into the fluidic phase when the external energy is supplied to the valve filler composition, and the time for the valve filler composition to change from the solid phase to the fluidic phase is less than two seconds when a laser beam of 1.5 W of the laser light source is applied to the valve filler composition, and the volume of the valve filler composition is not greater than ten microliters.

* * * * *